Nov. 24, 1931. T. SARRI 1,833,596
SHOCK ABSORBER
Filed Dec. 23, 1929 3 Sheets-Sheet 1
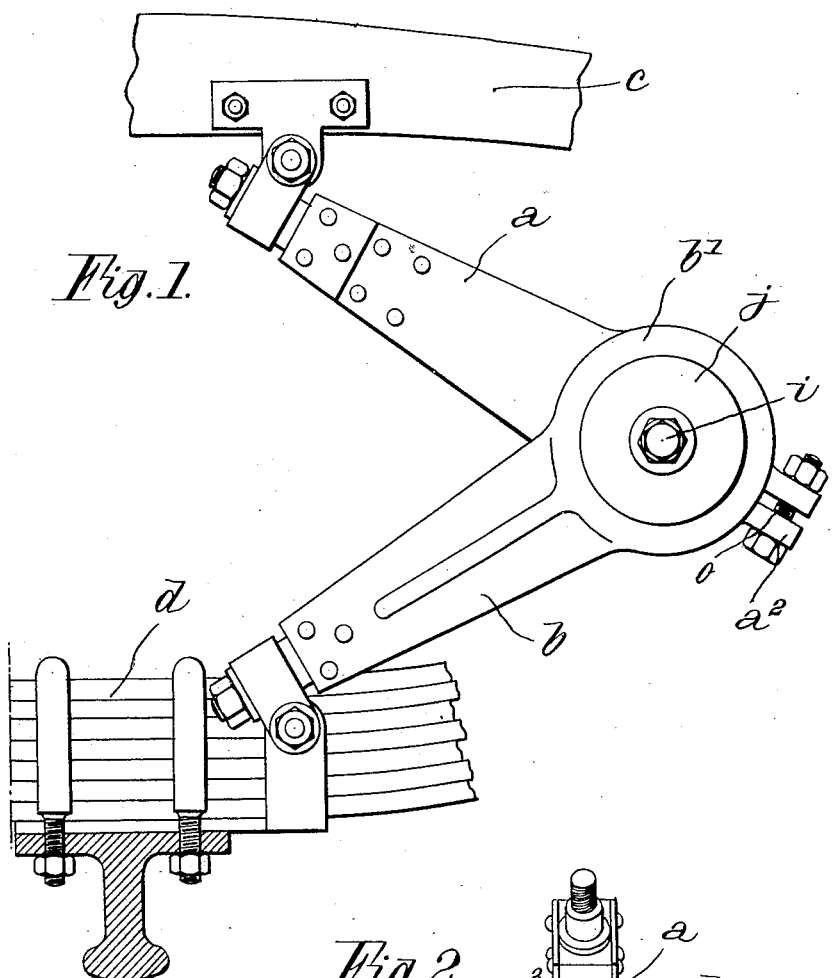
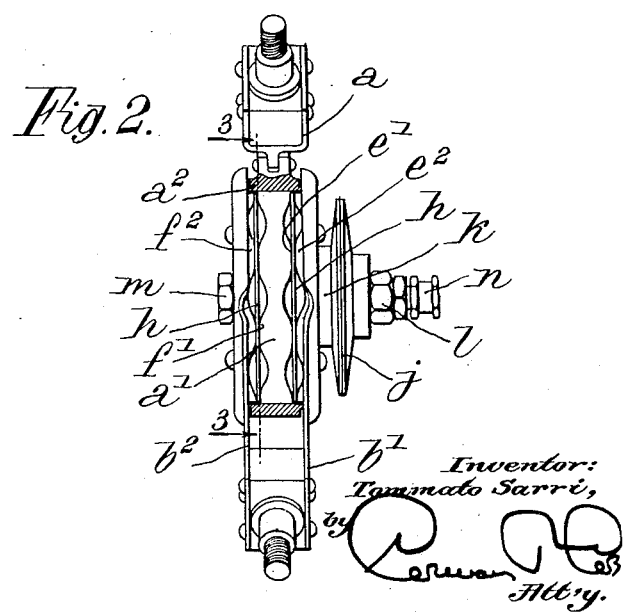

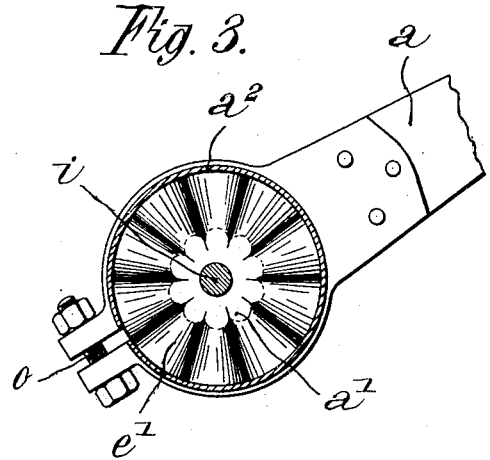
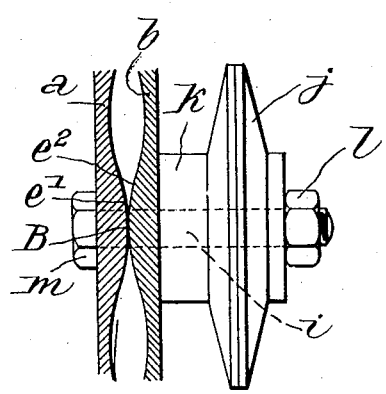
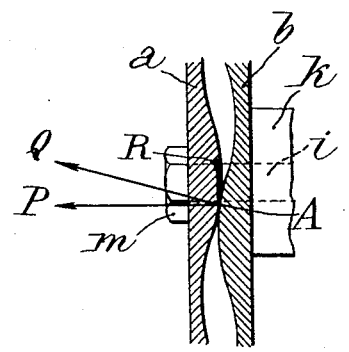

Nov. 24, 1931.  T. SARRI  1,833,596
SHOCK ABSORBER
Filed Dec. 23, 1929  3 Sheets-Sheet 3

Inventor:
Tommato Sarri,
by
Conway
Att'y.

Patented Nov. 24, 1931

1,833,596

UNITED STATES PATENT OFFICE

TOMMATO SARRI, OF PARIS, FRANCE

SHOCK ABSORBER

Application filed December 23, 1929, Serial No. 416,096, and in France July 12, 1929.

The present invention relates to shock-absorbers of the type adapted to be used on bicycles, automobiles and the like and more especially, on vehicles provided with springs.

One of the objects of the invention is to provide a form of shock absorber which may be easily assembled and adjusted and which reacts easily to small shocks.

Another object is to provide a shock-absorber whose action increases with the amplitude of the displacing shock.

Further objects will appear in the course of the detailed description now to be given with reference to the accompanying drawings, in which:—

Fig. 1 is an elevation of one illustrative embodiment of the invention;

Fig. 2 is an end-view of the structure represented in Fig. 1;

Fig. 3 is a section taken on line 3—3 of Fig. 2;

Figs. 4 and 5 represent, diagrammatically, the shock-absorber represented in Figs. 1 to 3 at two different stages in the operation thereof;

Figure 6:
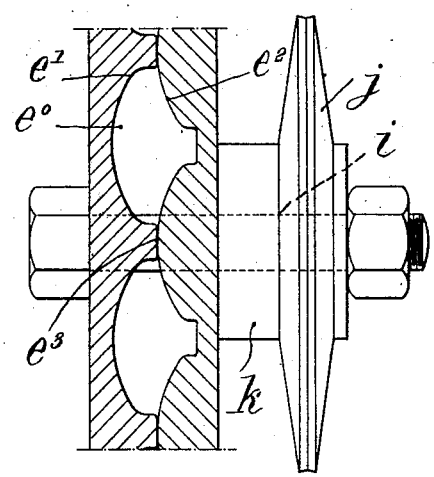
Fig. 6 illustrates, in partial section, a special form of shock-absorber designed to vary the resistance with the amplitude of the shock.

Referring to Figs. 1 to 5 of the drawings, there is shown an arm $a$ connected at one extremity to a chassis $c$,—a pair of arms $b^1$, $b^2$ positioned on opposite sides of arm $a$ and connected to a spring $d$, supporting chassis $c$, said arms having radially corrugated surfaces $e^2$ and $f^2$ of sine-curve or similar trigonometric form (Figs. 2 and 3) on the side of each facing arm $a$,—a radially corrugated disc $a^1$ positioned between surfaces $e^2$ and $f^2$ and having surfaces $e^1$, $f^1$ formed so that the summits thereof coincide with those of $e^2$ and $f^2$,—a pair of annular branches $a^2$ integral with, or rigidly connected to, arm $a$ and embracing disc $a^1$, said branches being provided with a bolt $o$ adapted to force the latter into gripping relation with disc $a^1$,— a bolt $i$ provided with a head $m$ and traversing elements $b^1$, $a^1$ and $b^2$,—and a resilient assembly for maintaining $b^1$, $a^1$ $b^2$ in assembled relation consisting of a washer $k$, a pair of Belleville disc $j$, and a nut and lock-nut $l$. Bolt $i$ may be made hollow and fitted with a greasing element $n$.

In order to reduce wear due to the movement of surfaces $e^1$, $f^1$ and $e^2$, $f^2$ in contact with one another, element $a^1$ may be formed of ordinary white cast iron, while elements $b^1$ and $b^2$ may be made of malleable cast iron, the contacting portions of $b^1$ and $b^2$, being machined and polished to reduce the friction therebetween. If desired, thin, flexible, washers $h$ formed of nickel-chromium or silico-manganese steel, or even of highly compressed fiber and having a low coefficient of friction may be interposed between $e^1$, $f^1$ and $e^2$, $f^2$ to prevent rapid wear.

The device is assembled, and operates, in the following manner:—

The vehicle being at rest and the various operative elements being loosely assembled, disc $a^1$ is adjusted so that the summits of the corrugations of surfaces $e^1$ and $f^1$ lie opposite the corresponding summits of $e^2$, $f^2$. Bolt $o$ is then tightened to rigidly fix elements $a^1$ and $a^2$ relatively to one another and nut $l$ is taken up so as to bring surfaces $e^1$, $f^1$ and $e^2$, $f^2$ into forcible contact with one another under the resilient action of Belleville discs $j$. When the vehicle is on the road and the wheels enter a hole or encounter a protuberance, surfaces $e^1$, $f^1$ and $e^2$, $f^2$ will suffer an angular displacement relatively to one another and, under the compressive action of discs $j$, will move towards one another from the position shown in Fig. 4 to that shown in Fig. 5. It can be shown that, if the compression of discs $j$ be sufficient to compensate for variations in the elastic effect exerted by spring $d$, the angular displacement of point of contact B (Fig. 4) to position A (Fig. 5) is proportional to the relative angular displacements of arms $a$ and $b^1$, $b^2$. If the wheel enters a depression in the road, arms $a$ and $b^1$, $b^2$ will move away from one another and the summits of $e^1$, $f^1$ will move towards the troughs of $e^2$, $f^2$ i. e. wheels will be aided in moving downward into contact with the ground, while the chassis continues its horizontal course. At the moment that the chassis begins to follow the wheel downward, its rate of descent is diminished by the movement of the inclined portions of $e^1$, $f^1$ and $e^2$, $f^2$ over one another, the latter acting to oppose diminution of the angle between arms $a$ and $b^1$, $b^2$. The same analysis, in inverse form, applies to the case where the wheel encounters a protruding inequality in the road.

Figure 7:
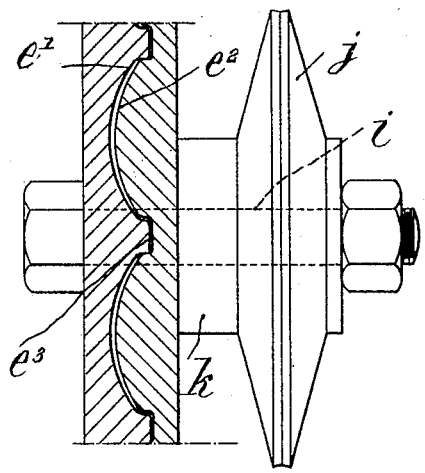
Fig. 7 shows the structure represented in Fig. 6 at a different stage in its operation.

The modified forms of surface shown in Figs. 6 and 7 are designed to offer an augmented resistance to displacements of large amplitude taking place in a short interval of time (case of a vehicle moving rapidly over a very rough road). Here, disc $a^1$ (Figs. 1 to 5) is eliminated and two arms $a$ and $b$ are provided with interengageable surfaces $e^1$ and $e^2$ formed to present a flattened top portion of large curvature, lateral portions of gradually increasing curvature, and terminal flat portions $e^3$ offering a greatly augmented resistance, when in engagement, to relative angular displacement of surfaces $e^1$ and $e^2$. Shock absorbers of this type, when in equilibrium (Fig. 6), offer a very small resistance to angular displacement on account of the flattened tops of their corrugations, but once displaced into the position shown in Fig. 7 resist rapid displacement in either direction. Obviously, discs similar to $a^1$ (Figs. 1 to 5) and having corrugations of the form shown in Figs. 6 and 7 may be mounted between similarly shaped surfaces (Fig. 8) formed on a pair of arms corresponding to $b^1$, $b^2$, discs of the type $h$ already described being interposed between frictionally engaging surfaces $e^1$ and $e^2$, if desired.

Figure 8:
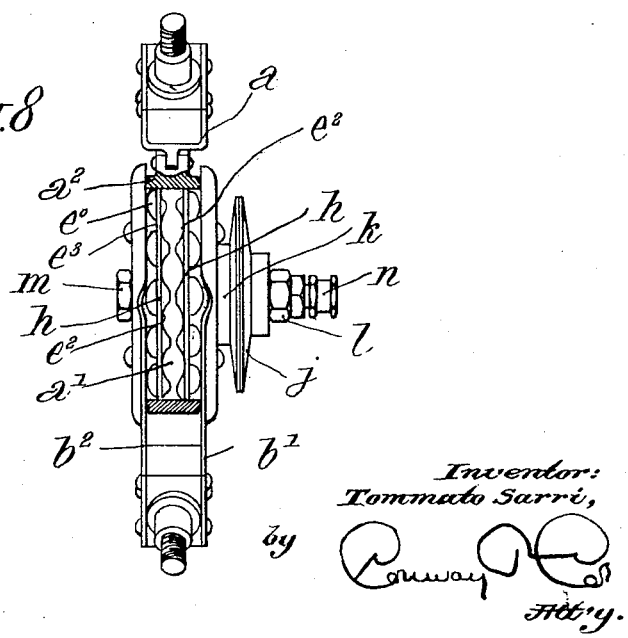
Fig. 8 is a view similar to that of Fig. 2 showing a shock absorber of the type having surfaces like those in Figs. 6 and 7.

The inventor is aware of the existance of devices in which a pair of corrugated surfaces lie in substantially continuous contact with one another when the shock-absorber is in equilibrium position, but he is not aware of any in which, as in Figs. 6, 7 and 8, only the most elevated portions of the corrugations are in contact in this position. Obviously, the mode of operation of devices of these two types is very different. In the former, the resistance to displacement is at a maximum for positions just adjacent the equilibrium position, in the latter the converse is true.

What I claim is:—

In a vehicle,—a chassis,—a spring supporting said chassis,—and a shock absorbing system adapted to react upon said spring and chassis and comprising a pair of pivotally engaging arms mounted to form an angle with one another which varies with, and by, relative displacements of the spring and of the chassis, one of said arms being provided with means for gripping a disc, the other of said arms being provided with a curved surface, a disc having a curved surface adapted to contact with said last named curved surface, said disc being adjustably mounted in the arm provided with gripping means so that, when the spring and chassis are in equilibrium position, the aforesaid curved surfaces contact tangentially, and resilient means for maintaining said curved surfaces in contact with one another.

In testimony whereof, I affix my signature.

ING. TOMMATO SARRI.